United States Patent Office 3,510,553
Patented May 5, 1970

3,510,553
DENTIFRICES CONTAINING FLUOSILICATES AND SILICA
James Richard Mellberg, Barrington, Ill., assignor to The Kendall Company, Boston, Mass., a corporation of Massachusetts
No Drawing. Filed Oct. 27, 1967, Ser. No. 678,542
Int. Cl. A61k 7/16
U.S. Cl. 424—52         11 Claims

ABSTRACT OF THE DISCLOSURE

A professional prophylactic dentifrice paste comprising an aqueous solution containing an alkali metal or ammonium fluosilicate to provide a fluorine content of 0.5 to 5% by weight, based on the total weight of the solution, a finely divided silica abrasive having particles which pass a 140 mesh screen (U.S. Standard sieve series) and are retained on 400 mesh; and preferably also containing phosphate ion; the paste has a pH of about 2.5 to 5.5 and a consistency, measured in accordance with A.S.T.M. Procedure D217, of 25 to 35 mm. penetration of the cone at 20° C., under a load of 82.5 grams.

---

This invention relates to dentifrices, and more particularly, to highly abrasive dentifrices for use by dentists.

It is an object of this invention to provide a highly abrasive dentifrice containing a fluoridating agent. It is a further object to provide a single prophylactic dentifrice, primarily for use by dentists, which functions both as an abrasive cleanser and as a fluoridating composition and which has a pasty consistency capable of use with conventional dental hygienic apparatus. It is another object of this invention to provide an acidulated phosphate dentifrice capable of producing prophylactic quantities of active fluoride ion and sufficiently abrasive for professional use.

The invention features a prophylactic dentifrice paste comprising an aqueous solution containing a fluosilicate selected from the class consisting of alkali metal and ammonium fluosilicates to provide a fluorine content of 0.5 to 5.0% by weight, based on the total weight of the solution, and a finely divided silica abrasive having particles which pass a 140 mesh screen (U.S. standard sieve series) and are retained on 400 mesh; the paste has a pH from about 2.5 to 5.5 and a consistency, measured in accordance with A.S.T.M. Procedure D217, of 25 to 35 mm. penetration of the cone at 20° C. under a load of 82.5 g.

In preferred embodiments, the fluosilicate is selected from the class consisting of ammonium fluosilicate and lithium fluosilicate; the aqueous solution includes phosphate ion in an amount from about 0.05 to about 0.5 molar; the dentifrice contains only cations selected from the class consisting of hydrogen, alkali metal and ammonium; the dentifrice includes a thickener chemically inert to the remaining ingredients; the silica has particles of such size that more than about 95% by weight pass a 200 mesh screen; the total weight of silica abrasive is from 2.5 to 3.5 times the weight of the solution, depending on the amount of thickener added; and the paste has a consistency of from 27.5 to 32.5 mm. measured by the previously described procedure.

The invention also features a process for making a highly abrasive prophylactic dentifrice paste comprising dissolving in an aqueous medium a fluosilicate selected from the class consisting of ammonium and alkali metal fluosilicates to provide a fluorine content of 0.5 to 5.0% by weight, based on the total weight of the solution, a soluble phosphate and an acid in an amount providing a phosphate ion concentration of about 0.05 to 0.5 molar and a pH of about 2.5 to 5.5, and combining therewith a finely divided silica abrasive having particles which pass a 140 mesh screen but are retained on a 400 mesh screen and a thickener chemically inert to the remaining ingredients to give the dentifrice a consistency from about 25 to 35 by A.S.T.M. Procedure D217 measured as millimeters penetration by the cone under a load of 82.5 g. at 20° C.

Other objects, features, and advantages will appear from the following description of preferred embodiments of the invention, taken together with the following non-limiting examples:

EXAMPLE 1

A paste was prepared according to the following recipe by dissolving the fluosilicate, phosphoric acid, phosphate, and hydroxyethyl cellulose in water at 20° C.

| Ingredient: | Parts by weight |
|---|---|
| Ammonium fluosilicate | 5.62 |
| Phosphoric acid (85%) | 0.79 |
| Monosodium phosphate monohydrate ($NaH_2PO_4 \cdot H_2O$) | 3.18 |
| Hydroxyethyl cellulose (QP 15000) thickener | 6.00 |
| Potassium sorbate preservative | 0.30 |
| Flavor and coloring | 1.2 |
| Water to 300 ml. | |

There were stirred into the solution at 20° C. 750 parts by weight of silica abrasive particles; all of the particles passed a 140 mesh screen and were retained on a 400 mesh screen; more than 95% by weight of the particles passed a 200 mesh screen. The paste had a pH of 3.0 and a consistency, measured by A.S.T.M. Procedure D217 in terms of millimeters penetration by a cone under a load of 82.5 g., of about 30 mm.

The resultant paste was stable (both in pH and in fluoride concentration) cosmetically (taste, color, etc.) acceptable, and of a consistency suitable for use with conventional professional cleaning apparatus and effective to increase the fluoride content of the tooth enamel when applied in the usual manner and allowed to remain on the teeth for 3 to 5 minutes.

EXAMPLE 2

The effectiveness of the dentifrice paste of the present invention in fluoridation of tooth enamel was shown by preparing a dentifrice containing in water solution ammonium fluosilicate (1.2% fluorine by weight, based on the total weight of solution), 0.1 molar phosphate ion (from phosphoric acid and sodium dihydrogen phosphate) at pH 3.0, the solution being mixed with silica abrasive (over 95% passing 200 mesh, 100% retained on 400 mesh) in the weight ratio of five parts of silica to two parts of solution.

Enamel samples treated with the foregoing paste were compared with samples treated with the same solution containing no silica, and with untreated control samples.

For each test, ten blocks of enamel previously cut from sound pumiced surfaces of human teeth of mixed ages were randomly chosen from a large supply (700). The blocks were covered with paraffin wax except for the surface to be treated (20–25 mm.²) and immersed in the solution or paste for four minutes with occasional agitation. After treatment they were briefly rinsed with distilled water to remove the treatment preparation and then soaked in a metastable calcium phosphate solution at 37° C. for 24 hours, simulating fluoride removal by saliva in vivo.

After removal from the calcium phosphate solution, the blocks were briefly rinsed with distilled water and four layers of enamel removed by successive immersion in 1.0 ml. of 0.5 N perchloric acid contained in the outer wells of Conway diffusion cells for periods of 30, 60 and 120 seconds. Concentrated perchloric acid (0.5 ml.) and 1.3 N sodium hydroxide (0.3 ml.) were added to the proper compartments of the diffusion cells.

The thickness of each enamel layer was calculated from a calcium analysis and the surface area of the treated enamel, assuming a calcium content and specific gravity of 36% and 2.90, respectively. Calcium in the dissolved enamel layers was determined by atomic absorption, spectrophotometry using 0.5% lanthanum chloride to suppress phosphate interference.

The following results were obtained:

FLUORIDE UPTAKE BY ENAMEL FROM SOLUTIONS WITH AND WITHOUT ABRASIVES

| Fluoride preparation | No. of blocks | P.p.m. F. in 2 consecutive layers [1] | | Thickness ($\mu$) of each layer [1] | | Acquired F. ($\mu$g. F./ cm.$^2 \times 20\,\mu$) |
|---|---|---|---|---|---|---|
| | | 1 | 2 | 1 | 2 | |
| Control | 30 | 1,311±75 | 768±45 | 10.2±0.4 | 10.8±0.4 | |
| Solution | 20 | 1,745±95 | 897±86 | 10.9±0.3 | 10.9±0.3 | 1.9 |
| Solution plus silica | 10 | 1,733±131 | 805±79 | 10.8±0.5 | 11.5±0.4 | 1.7 |

[1] Deviations given are standard errors.

EXAMPLE 3

The effect on fluoride uptake of adding certain humectants and thickening agents was also determined, using the same paste as described in Example 2, except that the listed thickeners and humectants were added to the acidulated phosphate solution prior to mixing with the abrasive. The results, obtained and calculated by the same procedure as the results tabulated in Example 2, are summarized below:

FLUORIDE UPTAKE BY ENAMEL FROM PASTES CONTAINING HUMECTANTS AND THICKENING AGENTS

| Agent | No. of blocks | P.p.m. F. in 2 consecutive layers [3] | | Thickness ($\mu$) of each layer [3] | | Acquired F. ($\mu$g. F/ cm.$^2 \times 20\,\mu$) |
|---|---|---|---|---|---|---|
| | | 1st | 2nd | 1st | 2nd | |
| None (std. paste) | 10 | 1,733±131 | 805±79 | 10.8±0.5 | 11.5±0.4 | 1.7 |
| 2% HEC [1] | 60 | 1,778±61 | 964±41 | 10.0±0.2 | 10.6±0.2 | 1.9 |
| 3% HEC | 10 | 1,522±111 | 835±69 | 10.3±0.3 | 10.5±0.2 | 0.8 |
| 30% Glycerol | 30 | 1,786±100 | 1012±68 | 8.9±0.2 | 10.2±0.3 | 1.6 |
| 40% sorbitol | 40 | 1,617±73 | 896±58 | 9.1±0.3 | 10.0±0.3 | 0.9 |
| 3% COS [2] | 10 | 1,765±214 | 874±109 | 9.9±0.8 | 10.9±0.7 | 1.7 |

[1] Hydroxy ethyl cellulose, QP 15000. Union Carbide Corp., New York, N.Y.
[2] Cab-o-sil, pyrolyzed silicon dioxide. Cabot Corp., Boston, Mass.
[3] Deviations given are standard errors.

For proper prophylactic activity, the paste should have about 0.5 to 5% fluorine by weight, based on total weight of solution, and preferably about 1 to 2%. For purposes of this invention, the amount of fluosilicate used to produce this amount of fluorine may be stoichiometrically calculated, assuming all the fluorine in the fluosilicate to be available.

An effective paste is obtained by substituting for the ammonium fluosilicate specified in the foregoing examples an equivalent quantity of lithium fluosilicate. While other alkali metal fluosilicates, such as sodium or potassium, also may be used in place of ammonium fluosilicate to a limited extent, the lower solubility of these compounds makes it more difficult to use them, particularly at higher concentrations within the desired range.

Because of the chemical reactions taking place at the tooth enamel surface in fluoridation, it has been previously found that an acid solution will deposit more fluoride than a neutral solution. Thus, it is desired to keep the pH of the present paste within the range of about 2.5 to 5.5. Similarly, a preferred embodiment of the present paste includes phosphate ion because, as is also known in the art, the presence of a certain amount of phosphate ion reduces the acid solubility of enamel and represses the formation of calcium fluoride, thus forces the fluoride to form the desired fluoroapatite compound with tooth enamel. A mixture of phosphoric acid and phosphate (e.g., from a soluble phosphate) also acts as a buffer system to stabilize the pH of the dentifrice during the fluoridation reactions. It has been found that between 0.05 and 0.5 molar concentrations of phosphate will keep a relatively stable pH while having the other desirable prophylaxis-aiding effects.

While other physiologically acceptable acids may be used in place of phosphoric acid to achieve the desired pH, phosphoric is the acid of choice because it provides desirable phosphate ion. Although phosphates other than sodium dihydrogen phosphate may be used, for example, ammonium dihydrogen phosphate, it is preferred that the composition contain as cations only hydrogen, alkali metals, and ammonium.

As seen in Examples 2 and 3, the consistency of the paste made in the specific embodiments therein described does appear to affect the fluoride uptake of tooth enamel, probably because the combination of these ingredients in an overly viscous paste results in inadequate diffusion of fluoride ion through the paste into the tooth enamel. The minimum acceptable viscosity depends both on the amount and particle size of the silica abrasive which must be contained in a paste for cleaning purposes, and on the minimum consistency necessary to make a paste which will cling to the teeth for a sufficient length of time to allow the adequate prophylactic fluoridation of the enamel. If a paste, once formulated, is later allowed to dry out, it has been found that rewetting to the above-described consistencies will return the paste to its predried effectiveness.

The preferred consistencies are described in terms of A.S.T.M. D217, a standard method for measuring consistencies of viscous materials, and are expressed, in millimeters, in terms of the depth to which a weighted (82.5 g.) cone penetrates the paste. The consistency should be between about 25 and 35 mm., and preferably between about 27.5 and 32.5 mm.

The required consistency may be achieved by adding a thickener such as hydroxy ethyl cellulose or any other thickener which is physiologically acceptable and chemically inert to the remaining ingredients of the dentifrice. Or, a larger proportion of silica (e.g., 3 to 3.5 parts to one part of the solution of Example 1) may be used, omitting the thickener entirely.

The particle size of silica chosen depends, of course, on the abrasiveness desired in the paste. A too coarse grade may result in removal of tooth enamel in harmful amounts while a too fine grade will not sufficiently cleanse the enamel to provide adequate fluoride penetration. The silica abrasive chosen should however preferably consist of particles which pass 140 mesh but are retained by 400 mesh; more preferably silica having about 95% of its particles passing 200 mesh is used.

Any conventional coloring agents or flavors may be used which are stable in acidic media and which are inert to the remaining ingredients of the dentifrice paste.

EXAMPLE 4

Since the dentifrice is designed to be used primarily by dentists, the effects of varying methods of application were tested. Four-minute treatment times were chosen to coincide with the previous examples and thirty-second times to simulate a typical interval of actual tooth prophylaxis. Unless otherwise noted, the treatment preparation contained 20 ml. of the solution described in Example 2, along with 2% hydroxyethyl cellulose by total weight of solution and 50 grams of silica. In some instances, tooth samples were simply immersed in the preparation; some samples were agitated with the preparation; and finally, some were abraded with the preparation by using a rubber cup and firm pressure. The results are summarized below.

EFFECT OF TREATMENT CONDITIONS ON FLUORIDE UPTAKE BY ENAMEL

| Treatment conditions | No. of Blocks | P.p.m. F. in 2 consecutive layers [1] | | Thickness ($\mu$) of each layer [1] | | Acquired F. ($\mu$g. F./ cm.$^2 \times 20\mu$) |
|---|---|---|---|---|---|---|
| | | 1st | 2nd | 1st | 2nd | |
| 30 sec. with abrasion (non F. paste) | 20 | 1,085±88 | 661±53 | 10.6±0.4 | 11.2±0.3 | −0.8 |
| 30 sec. APSiF$_6$ solution | 10 | 1,309±87 | 735±67 | 10.5±0.4 | 11.2±0.4 | 0.0 |
| 4 min. no agitation | 10 | 1,562±66 | 828±61 | 8.4±0.3 | 9.0±0.4 | 0.9 |
| 4 min. occasional agitation | 60 | 1,778±61 | 964±41 | 10.0±0.2 | 10.6±0.2 | 1.9 |
| 4 min. abrasion 1st 30 sec | 10 | 1,977±118 | 1,020±135 | 8.2±0.3 | 9.9±0.5 | 1.9 |
| 4 min. abrasion final 30 sec | 10 | 1,623±129 | 1,045±123 | 8.8±0.4 | 9.3±0.4 | 1.2 |
| 30 sec. no agitation | 20 | 1,270±66 | 758±55 | 9.2±0.3 | 9.9±0.4 | −0.3 |
| 30 sec. with abrasion | 20 | 1,147±73 | 623±52 | 9.5±0.4 | 10.4±0.4 | −1.0 |

[1] Deviations are standard errors.

Best results are obtained by abrading the teeth with the dentifrice first, followed by allowing the paste to remain in contact with the teeth for a few minutes.

Other embodiments will be apparent to those skilled in the art and are within the following claims:

What is claimed is:
1. A prophylactic dentifrice paste comprising an aqueous solution containing a sufficient amount of fluosilicate selected from the class consisting of ammonium and alkali metal fluosilicates to provide a fluorine content of about 0.5 to 5.0% by weight, based on the total weight of said solution, and a finely divided silica abrasive having particles which pass 140 mesh but are retained by 400 mesh, the abrasive being present in an amount effective for cleaning teeth and up to about 3.5 times the weight of said solution, said paste having a pH from about 2.5 to 5.5 and a consistency from about 25 to 35.

2. The dentifrice of claim 1 wherein said fluosilicate is ammonium fluosilicate.

3. The dentifrice of claim 1 wherein said fluosilicate is lithium fluosilicate.

4. The dentifrice of claim 1 including phosphate ion in said solution in an amount from about 0.05 to 0.5 molar.

5. The dentifrice of claim 1 having a consistency from about 27.5 to 32.5.

6. The dentifrice of claim 1 wherein said silica has a particle size such that over about 95% of said particles pass 200 mesh.

7. The dentifrice of claim 1 containing as cations only those selected from the class consisting of hydrogen, alkali metal and ammonium.

8. The dentifrice of claim 7 including in addition a thickener chemically inert to the remaining ingredients of the dentifrice.

9. The dentifrice of claim 8 wherein the weight of said silica is less than about 3 times the weight of said solution, and said thickening agent is present in sufficient amount to give said paste a consistency of about 25 to 35.

10. The dentifrice of claim 8 wherein said thickener is hydroxy ethyl cellulose.

11. A prophylactic dentifrice paste comprising 20 parts by weight of an aqueous solution comprising acidulated phosphate which is about 0.05 to 0.5 M in phosphate ion and which has a pH of about 2.5 to 5.5, and an amount of ammonium fluosilicate sufficient to provide a fluorine content of at least about 0.5% by weight based on the total weight of the solution,
about 50 parts by weight of a finely divided silica abrasive having particles which pass 140 mesh but are retained by 400 mesh,
and sufficient hydroxy ethyl cellulose to provide said paste with a consistency of 25–35.

References Cited

UNITED STATES PATENTS 3,337,112  8/1967  Elbreder _____ 424—128

OTHER REFERENCES

Segreto et al.: Journal of Dental Research, vol. 40, No. 1, pp. 90–96, January–February 1961.

RICHARD L. HUFF, Primary Examiner